United States Patent
Li et al.

(10) Patent No.: US 11,123,964 B2
(45) Date of Patent: Sep. 21, 2021

(54) FILM COMPOSITION FOR PAPER THERMAL LAMINATION APPLICATION

(71) Applicant: Dow Global Technologies LLC, Midland, MI (US)

(72) Inventors: Jeffrey J. Li, Shanghai (CN); Xiao B. Yun, Shanghai (CN); Eng K. Ma, Klang (MY)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/684,798

(22) Filed: Nov. 15, 2019

(65) Prior Publication Data

US 2020/0079062 A1    Mar. 12, 2020

Related U.S. Application Data

(63) Continuation of application No. 14/759,792, filed as application No. PCT/CN2013/072826 on Mar. 18, 2013, now abandoned.

(51) Int. Cl.
*B32B 27/08* (2006.01)
*B32B 27/10* (2006.01)
(Continued)

(52) U.S. Cl.
CPC .............. *B32B 27/08* (2013.01); *B32B 27/10* (2013.01); *B32B 27/30* (2013.01); *B32B 27/32* (2013.01);
(Continued)

(58) Field of Classification Search
CPC .......... B32B 2307/518; B32B 2307/75; B32B 2310/14; B32B 2439/00; B32B 27/08;
(Continued)

(56) References Cited

U.S. PATENT DOCUMENTS 6,033,786 A    3/2000  Fatica et al.
6,054,544 A    4/2000  Finlayson et al.
(Continued)

FOREIGN PATENT DOCUMENTS

CN    100534786 C    9/2009
CN    100534787 C    9/2009
(Continued)

OTHER PUBLICATIONS

PCT/CN2013/072826, International Search Report and Written Opinion of the International Searching Authority, dated Dec. 19, 2013.
(Continued)

*Primary Examiner* — Alicia J Sawdon

(57) ABSTRACT

The present invention relates to a multilayer film comprising a skin layer comprising a anhydride and/or carboxylic acid functionalized ethylene/alpha-olefin interpolymer having a melting point in the range of from 50 to 89° C., wherein the anhydride and/or carboxylic acid is present in an amount of from 0.02 to 0.3 percent by weight of the polyethylene based resin. The multilayer film further comprises a substrate layer comprising a resin selected from the group consisting of polypropylene or polyethylene terephthalate.

14 Claims, 1 Drawing Sheet

(51) Int. Cl.
*B32B 27/30* (2006.01)
*B32B 27/32* (2006.01)
*B32B 27/36* (2006.01)

(52) U.S. Cl.
CPC ........ *B32B 27/36* (2013.01); *B32B 2307/518* (2013.01); *B32B 2307/75* (2013.01); *B32B 2310/14* (2013.01); *B32B 2439/00* (2013.01)

(58) Field of Classification Search
CPC ......... B32B 27/10; B32B 27/30; B32B 27/32; B32B 27/36; C08F 2500/02; C08F 2500/08; C08F 2500/12
See application file for complete search history.

(56) References Cited

U.S. PATENT DOCUMENTS

| | | | |
|---|---|---|---|
| 6,335,410 B1 | 1/2002 | Finlayson et al. | |
| 6,723,810 B2 | 4/2004 | Finlayson | |
| 2003/0134975 A1 | 7/2003 | Coe | |
| 2004/0105994 A1* | 6/2004 | Lu | B32B 27/08 428/515 |
| 2010/0029827 A1* | 2/2010 | Ansems | B32B 27/08 524/451 |
| 2010/0160497 A1* | 6/2010 | Karjala | C08F 255/02 524/13 |

FOREIGN PATENT DOCUMENTS

| | | |
|---|---|---|
| CN | 101148106 | 9/2009 |
| CN | 100548670 C | 10/2009 |
| CN | 100566994 C | 12/2009 |
| CN | 102152581 | 8/2011 |
| CN | 103009754 | 4/2013 |
| EP | 2559747 | 2/2013 |
| EP | 2976219 | 1/2016 |
| JP | S649255 | 1/1989 |
| JP | 200442937 | 2/2004 |
| JP | 200582736 | 3/2005 |
| WO | 2006071826 | 7/2006 |
| WO | 2008092328 | 8/2008 |
| WO | 2012077706 | 6/2012 |
| WO | 2013185340 | 12/2013 |

OTHER PUBLICATIONS

PCT/CN2013/072826, International Preliminary Report on Patentability, dated Oct. 1, 2015.

* cited by examiner

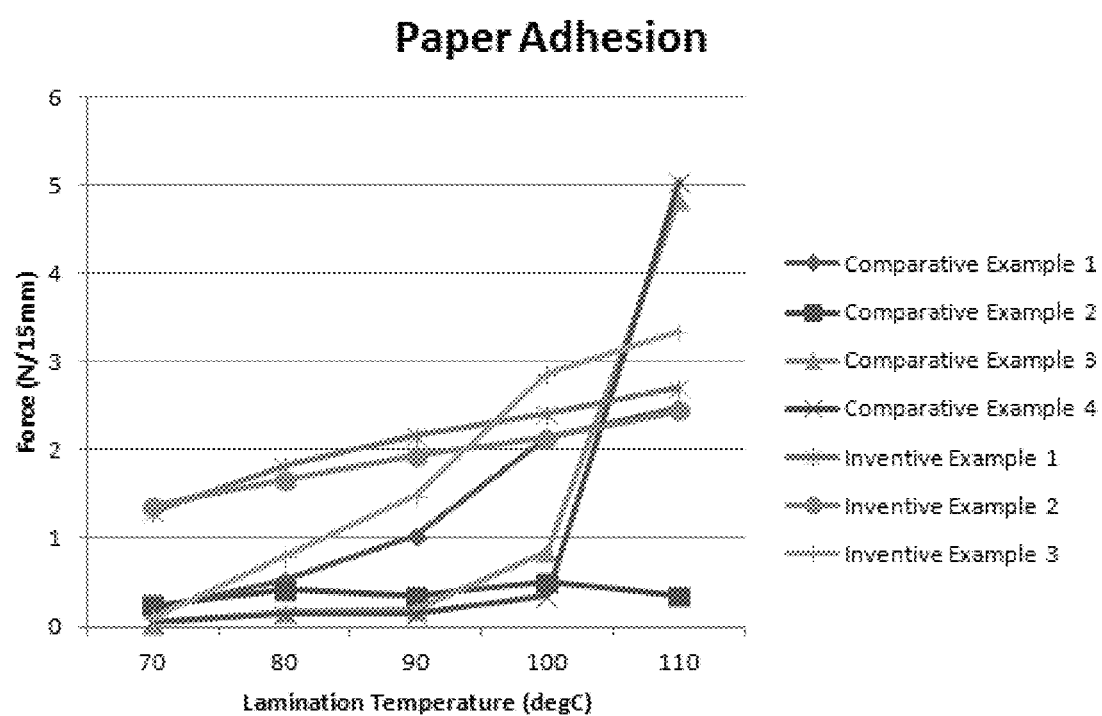

FILM COMPOSITION FOR PAPER THERMAL LAMINATION APPLICATION

FIELD OF INVENTION

The present invention relates to multilayer films which are particularly well suited for thermal lamination to paper substrates.

BACKGROUND AND SUMMARY OF INVENTION

High quality paper applications such as books, magazines decoration paper boxes, shopping bags, etc. typically include polymeric films bonded to the paper stock. These high quality paper applications usually require attributes such as surface protection, water resistance, mechanical strength and high surface gloss. Such attributes can be provided by well-known polymers such as biaxially oriented polypropylene ("BOPP") or biaxially oriented polyethylene terephthalate ("BOPET"), however such polymers typically do not adhere well to paper stock. Accordingly more complex film structures have been used in such applications.

Currently, the film structure of choice comprises a layer of ethylene vinyl acetate polymer ("EVA") adhered to a substrate such as BOPP or BOPET. EVA extrusion coated BOPP or BOPET film structures have been thermally laminated to paper stock for many years. The thickness of the EVA coating layer generally ranges from 5 to 50 micron. EVAs having a vinyl acetate content ranging from 18 to 20 percent by weight and having a melt index (190° C., 2.16 kg) in the range of from 14 to 20 g/10 min are usually employed, which have melting points in the range of 75° C. to 85° C. The combination of the low melting points with the inherent polarity from the vinyl acetate groups imparts the EVA extrusion coated films with very good paper adhesion and low lamination initiation temperature for more efficient processing. However, EVA has a tendency to degrade during processing which can cause issues such as film gels, yellowing, odor, etc. The processing temperature of EVA has to be kept lower than 250° C. in order to avoid degradation. Meanwhile, the global shortage autoclave reactors, which are typically used to produce EVA, will have a negative impact on the availability of such resins for this application in the long term.

Another available technology for adhering polymeric films to paper is to incorporate the functional skin layer into the substrate (such as BOPP) by one-step co-extrusion tenter frame sequential orientation process. Such technology is described in the following references CN100534787C, CN100566994C, and WO2008092328(A1). These references generally teach the BOPP film structure with the functional skin layer comprised of at least two components. A first component can be ethylene-butene copolymer having 10-30 wt % of units derived from butene, ethylene-octene copolymer having 5-20 wt % of units derived from octene, or ethylene-butene-octene terpolymer having 1-30 wt % of units derived from butene and 1-20 wt % of units derived from octene. The second component is a maleic-anhydride grafted version of the first component where the maleic anhydride is grafted in an amount of from 0.5-2 wt %.

In these references, the 20 wt % upper limit of the octene content represents the density range of 0.895 g/cm$^3$ or greater, which also limits the densities of the claimed MAH-g resins. The DSC melting points of the claimed E-O resins and their MAH grafted derivatives are no less than 95° C. based this octene % claim. The claimed BOPP films with the functional skin layers comprised of such high melting points PE and MAH grafted PE resins will therefore have lower paper adhesion strength and higher lamination temperature than the above mentioned EVA ex-coated films.

Accordingly, paper suppliers or manufacturers are looking for alternatives. The present invention relates to a multilayer film comprising a skin layer comprising a anhydride and/or carboxylic acid functionalized ethylene/alpha-olefin interpolymer having a melting point in the range of from 50 to 89° C., wherein the anhydride and/or carboxylic acid is present in an amount of from 0.02 to 0.3 percent by weight of the polyethylene based resin. The multilayer film further comprises a substrate layer comprising a resin selected from the group consisting of polypropylene or polyethylene terephthalate.

The inventive film has the functional skin layer comprised of the resins with melting points lower than 90° C. and is able to give higher paper adhesion strength and lower lamination temperature than the technologies disclosed in above arts.

The inventive film composition allows the film to achieve good paper adhesion at low applied lamination temperature thus fast lamination line speed.

BRIEF DESCRIPTION OF THE DRAWINGS

FIG. 1 is a graph showing the adhesion force as a function of lamination temperature for the indicated Examples presented in this specification.

DETAILED DESCRIPTION OF THE INVENTION

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), copolymer and interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/alpha-olefin interpolymer," as used herein, refers to an interpolymer that comprises, in polymerized form, a majority amount of ethylene monomer (based on the weight of the interpolymer), and one or more additional alpha-olefin monomers. The term "ethylene/alpha-olefin interpolymer" includes ethylene/alpha-olefin copolymers, as well as terpolymers and other polymers derived from multiple monomers.

The term, "ethylene/alpha-olefin copolymer," as used herein, refers to a copolymer that comprises, in polymerized form, a majority amount of ethylene monomer (based on the weight of the copolymer), and an alpha-olefin, as the only two monomer types.

The term, "EVOH" as used herein, refers to a polymer comprising repeating units of ethylene and vinyl alcohol. As is generally known in the art the weight ratio of the ethylene to vinyl alcohol defines the barrier properties. Such polymers and their methods of manufacture are generally known in the art.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Melt Index

Melt index ($I_2$, or MI) of an ethylene-based polymer is measured in accordance with ASTM D-1238, condition 190° C./2.16 kg. For high $I_2$ polymers ($I_2$ greater than, or equal to, 200 g/mole, melt index is preferably calculated from Brookfield viscosity as described in U.S. Pat. Nos. 6,335,410; 6,054,544; 6,723,810. $I_2$ (190° C./2.16 kg)=3.6126[10(log (η)−6.6928)/−1.1363]−9.31851, where η=melt viscosity, in cP, at 350° F.

DSC

Differential Scanning Calorimetry (DSC) is used to measure crystallinity in polyethylene (PE) based samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE. The sample is kept at this temperature for three minutes. Then the sample is cooled at a rate of 10° C./min to −60° C. for PE and kept isothermally at that temperature for three minutes. The sample is next heated at a rate of 10° C./min, until complete melting (second heat). The percent crystallinity is calculated by dividing the heat of fusion (Hf), determined from the second heat curve, by a theoretical heat of fusion of 292 J/g for PE, and multiplying this quantity by 100 (e.g., for PE, % cryst.=(Hf/292 J/g)×100.

Unless otherwise stated, melting point(s) (Tm) of each polymer is determined from the second heat curve obtained from DSC, as described above. The crystallization temperature (Tc) is measured from the first cooling curve.

Density

Density is measured in accordance with ASTM D-792. The density measured was a "quick density," meaning that the density was determined after one hour from the time of molding.

Maleic Anhydride Content-Fourier Transform Infrared Spectroscopy (FTIR) Analysis The concentration of maleic anhydride is determined by the ratio of peak heights of the maleic anhydride at wave number 1791 cm-1 to the polymer reference peak, which, in case of polyethylene, is at wave number 2019 cm-1. Maleic anhydride content is calculated by multiplying this ratio with the appropriate calibration constant. The equation used for maleic grafted polyolefins (with reference peak for polyethylene) has the following form, as shown in Equation 1.

$$MAH\ (wt.\ \%) = A*\{[FTIR\ PeakArea@1791\ cm\text{-}1]/[FTIR\ PeakArea\ 2019\ cm\text{-}1] + B*[FTIR\ PeakArea@1712\ cm\text{-}1]/[FTIR\_PeakArea@2019\ cm\text{-}1]\}$$ (Eqn. 1)

The calibration constant A can be determined using C13 NMR standards. The actual calibration constant may differ slightly depending on the instrument and polymer. The second component at wave number 1712 cm-1 accounts for the presence of maleic acid, which is negligible for freshly grafted material. Over time however, maleic anhydride is readily converted to maleic acid in the presence of moisture. Depending on surface area, significant hydrolysis can occur in just a few days under ambient conditions. The acid has a distinct peak at wave number 1712 cm-1. The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for one hour. Mylar and Teflon are suitable protective films to protect the sample from the platens. Aluminum foil must never be used (maleic anhydride reacts with aluminum). Platens should be under pressure (~10 ton) for about five minutes. The sample is allowed to cool to room temperature, placed in an appropriate sample holder, and then scanned in the FTIR. A background scan should be run before each sample scan, or as needed. The precision of the test is good, with an inherent variability of less than ±5%. Samples should be stored with desiccant to prevent excessive hydrolysis. Moisture content in the product has been measured as high as 0.1 weight percent. The conversion of anhydride to acid however is reversible with temperature, but may take up to one week for complete conversion. The reversion is best performed in a vacuum oven at 150° C.; a good vacuum (near 30 inches Hg) is required. If the vacuum is less than adequate the sample tends to oxidize resulting in an infrared peak at approximately 1740 cm-1, which will cause the values for the graft level to be too low. Maleic anhydride and acid are represented by peaks at about 1791 and 1712 cm-1, respectively.

Multilayer Film

The present invention relates to a multilayer film comprising a skin layer comprising an anhydride and/or carboxylic acid functionalized ethylene/alpha-olefin interpolymer having a melting point in the range of from 50° C. to 89° C., wherein the anhydride or carboxylic acid functionality is present in an amount of from 0.02 to 0.3 percent by weight of the polyethylene based resin. The multilayer film further comprises a substrate layer comprising a resin selected from the group consisting of polypropylene or polyethylene terephthalate.

Skin Layer

The skin layer of the films of the present invention comprises an anhydride and/or carboxylic acid functionalized ethylene/alpha-olefin interpolymer. The functionalized interpolymer has a melting point in the range of from 50° C. to 89° C., more preferably in the range of from 60 to 80° C.

In another embodiment of the present invention, the skin layer is MAH functionalized interpolymer blended with ethylene/alpha-olefin interpolymer or other polymer.

The anhydride or carboxylic acid functionality is present in an amount of from 0.02 to 0.3 percent by weight of the polyethylene based resin in the total skin layer, preferably 0.04 to 0.2 percent by weight in total skin layer. Preferred alpha-olefins include, but are not limited to, $C_3$-$C_{20}$ α-olefins, and preferably $C_3$-$C_{10}$ α-olefins. More preferred α-olefins include propylene, 1-butene, 1-pentene, 1-hexene, 1-heptene and 1-octene, and more preferably include propylene, 1-butene, 1-hexene and 1-octene. Preferably, when the comonomer is octene or hexene, the comonomer content is from 20%-40% wt, and when the comonomer is butene, the comonomer content is from 15%-30 wt %, with the balance preferably being ethylene.

The anhydride and/or carboxylic acid functionalization can be any material having the anhydride or carboxylic acid functionality as is generally known in the art. Maleic anhydride is a particularly favored material for functionalization.

Similarly, it is preferred that the anhydride and/or carboxylic acid functionalized ethylene/alpha-olefin interpolymer has a melt index ($I_2$), or calculated melt index ($I_2$), greater than or equal to, 2 g/10 min, 3 g/10 min, 4 g/10 min, 5 g/10 min or even 6 g/10 min. In one embodiment, the anhydride and/or carboxylic acid functionalized ethylene/alpha-olefin interpolymer has a melt index ($I_2$), or calculated melt index ($I_2$), less than, or equal to, 40 g/10 min, further less than, or equal to, 35 g/10 min, and more further less than, or equal to 25 g/10 min.

The anhydride and/or carboxylic acid functionalized ethylene/alpha-olefin interpolymer can advantageously have a percent crystallinity of less than, or equal to, 40 percent, further less than, or equal to, 30 percent, and further less than, or equal to, 20 percent, as determined by DSC. In one embodiment, the anhydride and/or carboxylic acid functionalized ethylene/alpha-olefin interpolymer has a percent crystallinity of greater than, or equal to, 2 percent, further greater than, or equal to, 5 percent, and further greater than, or equal to, 10 percent, as determined by DSC.

In one embodiment, the anhydride and/or carboxylic acid functionalized ethylene/alpha-olefin interpolymer has a density greater than, or equal to, 0.850 g/cm$^3$, further greater than, or equal to, 0.855 g/cm$^3$, add further greater than, or equal to, 0.860 g/cm$^3$. In one embodiment, the anhydride and/or carboxylic acid functionalized ethylene/alpha-olefin interpolymer has a density less than, or equal to, 0.900 g/cm$^3$, further less than, or equal to, 0.895 g/cm$^3$, and further less than, or equal to, 0.890 g/cm$^3$. In one embodiment, the anhydride and/or carboxylic acid functionalized ethylene/alpha-olefin interpolymer has a density from 0.855 g/cm$^3$ to 0.900 g/cm$^3$, further from 0.860 g/cm$^3$ to 0.895 g/cm$^3$, and further from 0.865 g/cm$^3$ to 0.890 g/cm$^3$.

The skin layer comprises from 75 to 100 weight percent, preferably from 5% to 30%, or 10% to 20% percent by weight of the anhydride and/or carboxylic acid functionalized ethylene/alpha-olefin interpolymer. It is also contemplated that the skin layer may comprise two or more anhydride and/or carboxylic acid functionalized ethylene/alpha-olefin interpolymer embodiments as described herein. Other materials which may be blended with the one or more anhydride and/or carboxylic acid functionalized ethylene/alpha-olefin interpolymers include nonfunctionalized ethylene/alpha-olefins, as well as materials such as EVA, EEA, and/or ionomers as is generally known in the art.

Suitable materials for use as the anhydride and/or carboxylic acid functionalized ethylene/alpha-olefin interpolymer for use in the skin layer of the multilayer films in the present invention are the functionalized low molecular weight ethylene/alpha-olefin interpolymers described in PCT/CN12/076986 and U.S. provisional application 61/722,274, each of which are incorporated by reference in their entirety.

The skin layer preferably has a thickness in the range of from 3 to 50 microns, more preferably 4 to 12 microns, and even more preferably in a range of from 10 to 30 microns.

Substrate Layer

The multilayer films of the present invention further comprise a substrate layer. The substrate layer comprises a resin selected from the group consisting of polypropylene or polyethylene terephthalate. The substrate layer preferably is biaxially oriented to gain high stiffness, high gloss and high dimensional stability. The surface of these substrates could be modified to gain some special properties like very high haze and paper like appearance.

Preferably, the polypropylene, if used, is homo-polypropylene.

Preferably the resin used in the substrate layer comprises 100% of the polypropylene or polyethylene terephthalate material, but it is contemplated that other materials maybe blended in amounts less than 25% by weight, more preferably less than 5%. It is also contemplated that two or more different polypropylene or polyethylene terephthalate polymers as described herein may be used as the substrate layer.

Preferably, the substrate layer has a thickness in the range of from 10 to 50 microns, more preferably from 10 to 20 microns.

The substrate and/or the skin layers may contain additives such as mineral oil or other plasticizers. Other additives generally known in the art include materials such as inorganic fillers, conductive fillers, pigments, nucleators, clarifiers, antioxidants, acid scavengers, oxygen scavengers, flame retardants, ultraviolet absorbers, processing aids such as zinc stearate, extrusion aids, slip additives, permeability modifiers, anti-static agents, antiblock additives and other thermoplastic polymers.

Film Structure

The films of the present invention may be films consisting of only the skin layer and the substrate layer, but they may advantageously contain additional layers. These additional layers may be located on either side of the substrate layer. One additional layer which may be advantageously used in the present invention is a primer coating between the substrate layer and the skin layer. Such materials are known in the art for improving adherence between the substrate layer and the skin layer. Other materials which may be advantageously added include barrier layers such as EVOH and other polymeric materials selected from the group consisting of propylene based plastomers or elastomers, propylene homopolymers, MDPE, HDPE, LLDPE, LDPE or blends thereof. The additional layers may also advantageously comprise a polymeric material selected from the group of polymers with the general name of polyamide (Nylon—Tradename of DuPont).

The multilayer films of the present invention preferably have a total thickness, in the range of from 10 μm to 100 μm, more preferably from 15 μm to 50 μm, more preferably from 18 μm to 30 μm.

The films can be formed using any process generally known in the art including blown films and cast films, in which the individual layers can be coextruded.

Of particular interest for some applications, the films may be oriented in the machine direction or the cross direction, or both the machine and cross direction following the film forming step.

The films of the present invention may advantageously be treated, such as by corona treatment, flame treatment and plasma treatment, as is generally known in the art.

The films of the present invention are particularly well suited for thermal lamination to paper substrates.

Multilayer film structures of the present invention may be blank or may advantageously be printed. For printed structures, it is generally preferred that the skin layer of the present invention be close to the printed ink.

The polymers, compositions and processes of this invention, and their use, are more fully described by the following examples. The following examples are provided for the purpose of illustrating the invention, and are not to be construed as limiting the scope of the invention.

Examples

The properties of the resins employed in the trial are tabulated in Table 1.

The following resins were used to make a series of films which were then laminated to paper stock as detailed below.

TABLE 1

Resin properties.

| Resin Type | Grade Name | Melt Index (190 C./ 2.16 kg), g/10 min | Density, g/cm3 | DSC melting point, deg C. | MAH content, wt % | VA content, wt % |
|---|---|---|---|---|---|---|
| Resin A | Polyolefin Elastomer | 5 | 0.870 | 63 | | |
| Resin B | Polyolefin Elastomer | 18 | 0.880 | 76 | | |
| Resin C | Polyolefin Elastomer | 12 | 0.893 | 89 | | |
| Resin D | Polyolefin Elastomer | 7.5 | 0.902 | 98 | | |
| Resin E | MAH Grafted Polyolefin Elastomer | 10 | 0.870 | 63 | 0.8 | |
| Resin F | LDPE | 8 | 0.918 | 107 | | |

| | JIS K6924-2 | JIS K7112 | JIS K7121 | JIS K7192 |
|---|---|---|---|---|
| Resin G  EVA | 14 | 0.940 | 75 | 20 |

An extrusion coating trial is conducted on a pilot line. This line is equipped with four extruders and a 5-layer feedblock. Three of the extruders have a diameter of 25 mm diameter, and one has a 30 mm diameter. The screw has a length over diameter ratio of 25:1. All extruders can be operated independently and hence, only the 30 mm diameter extruder is used in this trial. This extruder supplies the resin to the core layer in the feedblock.—The 300 mm width slot die is of coat-hanger geometry. A 0.7 mm die gap is used. A 12 micron chemical primed BOPET substrate is fed by the unwinder with a controlled unwinding tension. No in-line corona treatment is equipped so the films are not treated.

The properties of the resins employed in the trial are tabulated in Table 1.

The trial run design of the coating layer is tabulated in Table 2. The target coating layer thickness is set to 30 micron.

TABLE 2

Coating layer formulation design

Coating Layer Formulation

| Comparative Example 1 | 100% Resin G |
| Comparative Example 2 | 100% Resin A |
| Comparative Example 3 | 70% Resin C + 20% Resin E + 10% Resin F |

TABLE 2-continued

Coating layer formulation design

Coating Layer Formulation

| Comparative Example 4 | 80% Resin D + 20% Resin E |
| Inventive Example 1 | 80% Resin A + 20% Resin E |
| Inventive Example 2 | 90% Resin A + 10% Resin E |
| Inventive Example 3 | 70% Resin B + 20% Resin E + 10% Resin F |

Paper thermal lamination was done on a roll laminator made by ChemInstrument Inc. located in lab #2F510 in Shanghai Dow Center. A 250 gsm black color printed craft paper was employed for thermal lamination.

Key parameters are:
Lamination speed: 1.1 mpm
Nip pressure: 0.38 MPa
Lamination temperature: 70-110 deg C. with 10 deg C. interval.

Each sample is laminated twice through the nip rolls.

The laminated samples were conditioned at ambient temperature for 48 hours before peel test. The peel test was done on a tensile machine with below parameter settings:
Sample width: 15 mm
Peel mode: 180 degree T-peel
Peel speed: 300 mm/min The plateau peel force is reported as the paper adhesion strength in the unit of N/15 mm.

Results of the paper adhesion strengths are summarized in Table 3 and plotted in FIG. 1.

TABLE 3

Paper adhesion strengths

| N/15 mm | Lamination Temperature, deg C. | | | | |
|---|---|---|---|---|---|
| | 70 | 80 | 90 | 100 | 110 |
| Comparative Example 1 | 0.19 | 0.53 | 1.03 | 2.15 | 2.49 |
| Comparative Example 2 | 0.25 | 0.42 | 0.35 | 0.52 | 0.35 |
| Comparative Example 3 | 0.04 | 0.17 | 0.19 | 0.85 | 4.84 |
| Comparative Example 4 | 0.06 | 0.14 | 0.14 | 0.35 | 5.04 |
| Inventive Example 1 | 1.3 | 1.83 | 2.16 | 2.41 | 2.71 |
| Inventive Example 2 | 1.38 | 1.66 | 1.94 | 2.14 | 2.45 |
| Inventive Example 3 | 0.11 | 0.81 | 1.48 | 2.88 | 3.34 |

Surprisingly, the combination of polyolefin elastomer resin of the melting point below 89 deg C. and 10-20 wt % MAH grafted resin shows high paper adhesion strengths at low thermal lamination temperatures. As shown in FIG. 1, Inventive Example 1, 2 and 3 show higher paper adhesion strengths than Comparative Example 1, which is 100% NUC-3461, at all the studied thermal lamination temperatures of 70-110 deg C.

Comparative Example 2 shows lower paper adhesion strengths at all studied lamination temperatures than Comparative Example 1, which implies that without small amount of MAH grafted resin in the formulation, straight polyolefin elastomer resin cannot achieve as high paper adhesion strengths as EVA at the studied lamination temperatures, even though its melting point is lower than 80 deg C.

Comparative Example 3 and 4 show lower paper adhesion strengths at 70-100° C. than Comparative Example 1, which implies that the polyolefin plastomer resins of the melting point above 89° C. cannot achieve as high paper adhesion strengths as EVA at the studied lamination temperatures, even though they have the MAH grafted resin blended in the formulations.

FIG. 1 graphically shows that the three inventive example films labeled as "Inventive Example 1", "Inventive Example 2" and "Inventive Example 3" give equivalent or higher paper adhesion strengths than the four comparative example films labeled as "Comparative Example 1", "Comparative Example 2", "Comparative Example 3" and "Comparative Example 4" at the lamination temperatures in the range from 70 to 100° C.

What is claimed is:

1. A thermally laminated paper structure comprising
(a) a multilayer film comprising: (1) a skin layer comprising an anhydride and/or carboxylic acid functionalized ethylene/alpha-olefin interpolymer having a melting point in the range of from 50 to 89° C., a density from 0.855 g/cm$^3$ to 0.900 g/cm$^3$, and a melt index ($I_2$) from 2 g/10 min to 40 g/10 min, wherein the anhydride or carboxylic acid functionality is present in an amount of from 0.02 to 0.3 percent by weight of the skin layer, and a polyolefin elastomer having a melting point below 89° C., and (2) a substrate layer comprising a resin selected from the group consisting of polypropylene or polyethylene terephthalate; and
(b) a paper substrate.

2. The thermally laminated paper structure of claim 1, wherein the skin layer has a thickness in the range of from 3 to 50 microns.

3. The thermally laminated paper structure of claim 1, wherein the skin layer has a thickness in the range of from 4 to 12 microns.

4. The thermally laminated paper structure of claim 1, wherein the skin layer has a thickness in the range of from 10 to 30 microns.

5. The thermally laminated paper structure of claim 1, wherein the multilayer film further comprises one or more additional layers.

6. The thermally laminated paper structure of claim 5, wherein one additional layer is a barrier layer.

7. The thermally laminated paper structure of claim 1, wherein the multilayer film comprises a primer coating between the substrate layer and the skin layer.

8. The thermally laminated paper structure of claim 1, wherein the substrate layer is biaxially oriented.

9. The thermally laminated paper structure of claim 1, wherein the anhydride and/or carboxylic containing functionality is maleic anhydride.

10. The thermally laminated paper structure of claim 1, wherein the substrate layer has a thickness in the range of from 10 to 50 microns.

11. The thermally laminated paper structure of claim 1, wherein the substrate layer has a thickness in the range of from 10 to 20 microns.

12. The thermally laminated paper structure of claim 1, wherein the multilayer film has an overall thickness in the range of from 10 to 100 microns.

13. The thermally laminated paper structure of claim 1, wherein the skin layer has been surface treated by corona, flame or plasma and has a surface tension of greater than or equal to 36 dynes.

14. A thermally laminated paper structure comprising
(a) a multilayer film comprising: (1) a skin layer comprising an anhydride and/or carboxylic acid functionalized ethylene/alpha-olefin interpolymer having a melting point in the range of from 50 to 89° C., a density from 0.855 g/cm$^3$ to 0.900 g/cm$^3$, and a melt index ($I_2$) from 2 g/10 min to 40 g/10 min, wherein the skin layer comprises from 5% to 30% by weight of the anhydride and/or carboxylic acid functionalized ethylene/alpha-olefin interpolymer, and (2) a substrate layer comprising a resin selected from the group consisting of polypropylene or polyethylene terephthalate; and
(b) a paper substrate.

* * * * *